Patented June 5, 1928.

1,672,157

UNITED STATES PATENT OFFICE.

WILLY O. HERRMANN AND WOLFRAM HAEHNEL, OF MUNICH, GERMANY, ASSIGNORS TO CONSORTIUM FUER ELEKTROCHEMISCHE INDUSTRIE, OF MUNICH, GERMANY.

PROCESS OF MANUFACTURING RUBBERLIKE PRODUCTS.

No Drawing. Application filed November 8, 1926, Serial No. 147,180, and in Germany November 23, 1925.

We have found a process of manufacturing rubber like products from polymerized vinyl compounds. These polymerized vinyl compounds are polymerized vinyl alcohol or derivatives thereof such as esters, ethers, acetals and the like. Vinyl alcohol itself is a theoretical material of which we have discovered a polymerized form as described in our copending application, S. N. 44,410 filed July 17, 1925. This polymerized vinyl alcohol can be obtained by acid or alkaline saponification of vinyl esters or polymerized vinyl esters.

As an example of preparation of such a polymerized vinyl alcohol the following is given: 60 grams of potassium hydroxide are dissolved in 50 grams of ethyl alcohol in a vessel equipped with a stirrer. To this solution are added with thorough agitation, 60 grams of ground polymerized vinyl acetate. After agitating about half an hour the precipitated polymer of vinyl alcohol is separated on a filter and dried.

This polymer of vinyl alcohol is a water soluble powder having no odor, of white color and a formula of $(CH_2=CHOH)_n$ wherein $n$ is varying but has an average value of 18 to 20. This polymer undergoes the reaction theoretically expected of the alcohol and derivatives of vinyl alcohol can be prepared therefrom. For example, if polymerized vinyl alcohol is treated with butyric anhydride a vinyl butyrate is formed; vinyl aleuritinate trioxystearate or glycollate can be prepared from the vinyl alcohol polymer and the corresponding acids; if a solution of polymerized vinyl alcohol and sodium hydroxide is evaporated the sodium alcoholate is formed.

The process of this invention consists in treating polymerized vinyl alcohol or its derivatives with sulphur or sulphur compounds under application of heat. This treatment causes a combination of the vinyl compounds with the sulphur and is similar to that of vulcanizing rubber and therefor the process is referred to as a vulcanization process in the specification and claims. Similarly also, "accelerators" or catalysts for this reaction may be employed.

According to the conditions under which the reaction is carried out for instance the duration of heating or pressing, the temperature used, the pressure chosen and according to the properties of the starting material a variety of different products may be obtained more or less similar to different qualities of soft or hard rubber but besides this with specific chemical and technical properties.

The following examples show some modes of executing our process and some products obtainable by our process but we wish to be understood that our process is not limited to these examples but comprises also other methods for executing this new reaction of sulfur and its compounds on polymeric vinyl alcohol and their derivatives as stated above, also other products of this vulcanizing process.

Example I.

Polymeric vinyl alcohol which was obtained according to our application S. N. 44,410 was mixed with 1% sulfur and treated for 5 hours at 150° C. under a pressure of 10 atmospheres. The reaction product obtained was a black hard rubberlike material which can be worked by cutting, sawing, filing or the like.

Example II.

Polymeric vinyl alcohol was mixed with 2% sulfur and 2% piperidine as accelerator. This mixture was heated only for half an hour at 120° C. under pressure of 10 atmospheres.

The product obtained was about the same black hard rubberlike material as in Example I.

Example III.

Polymeric vinyl alcohol which was obtained according to our application S. N. 44,410 was covered at ordinary temperature with a 10 per cent solution of sulfur monochloride in carbondisulfide. After 24 hours the liquid was removed and the reaction product washed with hot water. This reaction product obtained was a grey coloured plastic material similar to vulcanized soft rubber.

Example IV.

1000 grams of a 30 per cent solution of polymerized vinyl acetate in 96 per cent ethyl alcohol were mixed with 45 grams of sulfurmonochloride. A soft mass separated which after being washed with boiling water was a hard and elastic material of yellowish grey colour.

The new products obtained according to this vulcanizing process can be directly used for a variety of technical purposes and in the arts. They can be worked into desired shapes in various ways by pressing, cutting, sawing, filing and the like for themselves or in mixture with additional materials such as fillers and the like.

But it is also possible to mix other additional substances like coloring matters, fillers for instance cotton flocks or other fibrous material, ground cork or other material used in the manufacture of moulded articles to the starting material and to subject this mixture to the vulcanizing process as described. The vulcanizing process under pressure can be carried out in suitable presses and the vulcanized material thus directly obtained in the desired form.

*Example V.*

Polymeric vinyl alcohol was mixed with 25% ground slate and 1% sulfur. This mixture was for half an hour pressed at a temperature of 150° C. in a press under a pressure of 100 atmospheres. A hard slateblue material was obtained.

What we claim is:

1. The process of manufacturing rubber like products by subjecting polymeric vinyl compounds to a vulcanizing process.

2. The process of manufacturing rubber like products by treating polymeric vinyl compounds with sulfur.

3. The process of manufacturing rubber like products by treating polymeric vinyl compounds with sulfur compounds.

4. The process of manufacturing rubber like products by treating polymeric vinyl compounds with sulfur and accelerators.

5. The process of manufacturing rubber like products by treating polymeric vinyl compounds with sulfur compounds and accelerators.

6. The process of manufacturing rubber like products by subjecting polymeric vinyl compounds to a vulcanizing process under pressure.

7. The process of manufacturing rubber like products by subjecting polymeric vinyl compounds to a vulcanizing process under heating.

8. The process of manufacturing rubber like products by subjecting polymeric vinyl compounds to a vulcanizing process under pressure and heating.

9. The process of manufacturing rubber like products by subjecting polymeric vinyl compounds in mixture with additional substances to a vulcanizing process.

10. The process of manufacturing rubber like products by subjecting polymeric vinyl compounds in mixture with additional substances to a vulcanizing process under pressure.

11. The process of manufacturing rubber like products by subjecting polymeric vinyl compounds in mixture with additional substances to a vulcanizing process under heating.

12. The process of manufacturing rubber like products by subjecting polymeric vinyl compounds in mixture with additional substances to a vulcanizing process under pressure and heating.

13. As a product of manufacture vulcanized polymeric vinyl compounds obtained by subjecting polymeric vinyl compounds to a vulcanizing process.

14. As a product of manufacture vulcanized polymeric vinyl compounds in mixture with additional substances.

15. As a new product vulcanized polymeric vinyl compounds.

WILLY O. HERRMANN.
WOLFRAM HAEHNEL.